May 19, 1925.

J. RATH 1,538,214

LIQUID MEASURING DEVICE

Filed July 17, 1920

John Rath, Inventor

By his Attorney

Patented May 19, 1925.

1,538,214

UNITED STATES PATENT OFFICE.

JOHN RATH, OF BAYONNE, NEW JERSEY.

LIQUID-MEASURING DEVICE.

Application filed July 17, 1920. Serial No. 396,952.

*To all whom it may concern:*

Be it known that I, JOHN RATH, a citizen of the United States of America, and a resident of Bayonne, county of Hudson, and State of New Jersey, have invented certain new and useful Improvements in Liquid-Measuring Devices, of which the following is a specification, reference being had to the accompanying drawings, forming a part thereof.

My invention relates to the measuring and recording of liquids as dispensed from a source of supply, such as, for example, a tank wagon. While my invention is adapted for various purposes, I have shown and described it as embodied in an attachment for tank wagons utilized in the distribution of oils or like liquids.

One object of my invention is to provide a simple and durable apparatus for the aforesaid purpose that shall produce an accurate record of the liquid dispensed from the wagon by the operator and serve at the same time as a convenient measuring device.

When oils and similar liquids are dispensed from tank wagons it is particularly desirable, not only from the point of view of the operating company or employer, but also from the point of view of the driver, to have an accurate record or check on the quantities of oils dispensed, in order that honest drivers may be protected, dishonest drivers detected, and losses and errors due to carelessness avoided.

According to my invention I provide a liquid measuring tank adapted to be connected to the outlet of a standard tank wagon arranged to be operated by a handle lever which actuates a registering mechanism.

In order that my invention may be thoroughly understood I will now proceed to describe same in the following specification and point out the novel features thereof in the appended claim.

Referring to the drawings.

Figure 1:
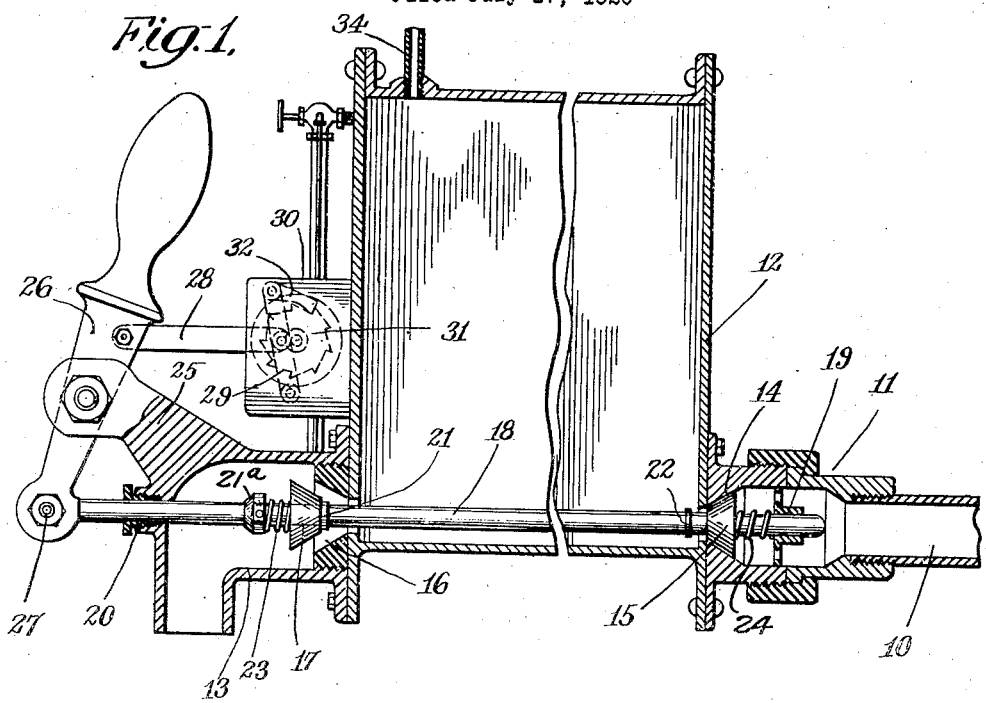
Figure 1 is a sectional elevation of a measuring and registering apparatus arranged and constructed in accordance with my invention.
Figure 2:
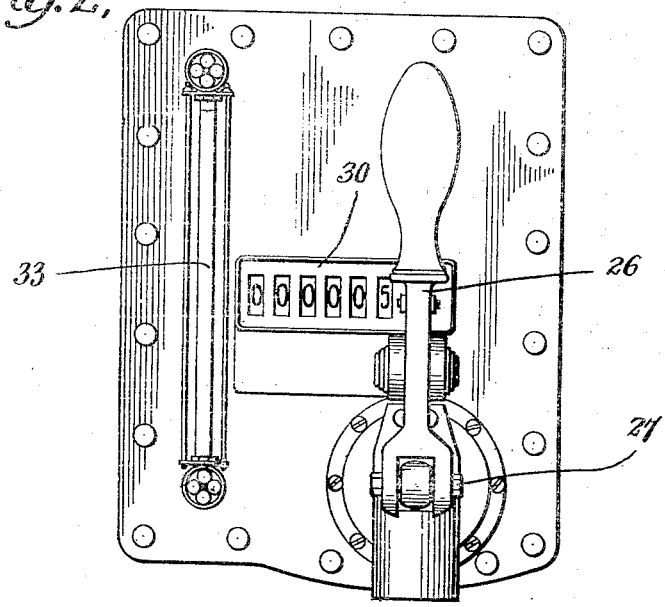
Figure 2 is a front view of the same mechanism.

10 designates the outlet from a standard tank wagon, and 11 designates a coupling by which the outlet is connected to a measuring tank 12. The tank has an outlet 13 through which the liquid contained in the measuring tank may be discharged into any suitable receptacle (not shown) as it is dispensed. The tank is provided with an inlet port 14 controlled by a valve 15, and an outlet port 16 controlled by a valve 17. The valves 15 and 17 are independently and loosely mounted on a valve rod 18 which extends through the tank and through the inlet and outlet ports and is slidably mounted in bearings 19 and 20. The valve 17 is located between collars 21 and 21ª fixed to one end of the rod and valve 15 is disposed between the bearing 19 and a collar 22 on the rod. The valves are spaced on the rod in such manner that when the rod is pulled in one direction, the valve 15 is closed and the valve 17 is opened, and when the rod is pushed in a reverse direction, the valve 17 is closed and the valve 15 is opened.

The valves are normally pressed against the collars 21 and 22 by springs 23 and 24. Lost-motion connections are thus provided so that both valves cannot be open at the same time.

The outlet 13 has a projection 25 on which a handle lever 26 is fulcrumed. The lever is pivotally connected at 27 to the outer end of the valve rod 18 and is joined by a link 28 to a pawl arm 29 of the registering mechanism.

The registering mechanism is designated 30 and may be of any suitable construction. It is mounted on the front of the measuring tank 12 and comprises a train of dial wheels which are interconnected in a well known manner, the first one of the train being provided with a ratchet 31 actuated by the pawl 32. The pawl is mounted on the arm 29 and the arrangement is such that when the lever 26 is operated to set the valves for filling and emptying the tank, the registering mechanism is advanced so that the total amount of liquid dispensed is indicated on the dials at all times.

The measuring tank is preferably provided with a gauge glass 33 to indicate when the tank is full in each instance. The tank is provided with the usual vent outlet 34.

The operation of the device will be apparent from the foregoing description, and may be outlined as follows:

Assuming that the measuring tank is empty and is connected to a source of supply such as the tank of an oil delivery wagon; if the attendant who is to measure out the usual unit such as five gallons, pulls outwardly on the lever 26 he thereby moves the valve rod 18 inwardly, first closing the valve 17 and then opening the valve 15. In this direction of motion the pawl 32 freely enters the next notch of the ratchet 31, and the oil flows from the supply tank into the measuring tank, and when the tank is full the attendant immediately returns the lever to the position shown in Fig. 1, having first placed a receiving can or receptacle under the discharge end of the outlet 13. The measuring tank is thus cut off from communication with the main tank and thereafter the discharge passage 16 is opened, allowing the contents of the measuring tank to flow out. This operation is repeated for each unit of measurement that is dispensed, and at the end of the day, or at the end of the run, the recording mechanism indicates accurately the number of times the measuring tank has been filled. Of course, the attendant might throw the lever before his measuring tank is entirely filled, but in this event the record would indicate more than he has actually dispensed so that it would be to his advantage to avoid an error of this kind. On the other hand it is impossible for him to draw out more liquid than is entered on the register inasmuch as the independent lost-motion connections between the respective valves and the actuating rod prevent both valve ports being opened at the same time.

A structure of preferred form and construction has been illustrated and described for the purpose of showing a way in which this invention may be used, but the inventive thought upon which this application is based is broader than this illustrative embodiment thereof, and I therefore intend no limitations other than those imposed by the appended claim.

What I claim is:

A dispensing mechanism comprising a measuring tank having oppositely disposed inlet and outlet ports, a valve actuating rod extending through said ports, oppositely disposed valves slidably mounted on said rod outwardly of said tank for controlling the ports, resilient means secured to said actuating rod for continuously exerting pressure inwardly against each of the valves, means secured to the actuating rod for actuating the alternate opening of the valves, a handle lever pivotally secured to the actuating rod, and a registering mechanism operatively connected to the lever.

In witness whereof, I have hereunto set my hand this 9th day of July, 1920.

JOHN RATH.